(12) United States Patent
Moore et al.

(10) Patent No.: US 7,645,437 B1
(45) Date of Patent: Jan. 12, 2010

(54) INTEGRATED BOILER, SUPERHEATER, AND DECOMPOSER FOR SULFURIC ACID DECOMPOSITION

(75) Inventors: Robert Moore, Edgewood, NM (US); Paul S. Pickard, Albuquerque, NM (US); Edward J. Parma, Jr., Albuquerque, NM (US); Milton E. Vernon, Albuquerque, NM (US); Fred Gelbard, Albuquerque, NM (US); Roger X. Lenard, Edgewood, NM (US)

(73) Assignee: Sandia Corporation, Albuquerque, NM (US)

(*) Notice: Subject to any disclaimer, the term of this patent is extended or adjusted under 35 U.S.C. 154(b) by 164 days.

(21) Appl. No.: 11/873,451

(22) Filed: Oct. 17, 2007

Related U.S. Application Data

(60) Provisional application No. 60/890,878, filed on Feb. 21, 2007.

(51) Int. Cl.
*B01J 19/00* (2006.01)
*C01B 17/48* (2006.01)

(52) U.S. Cl. ............ 423/539; 422/129; 422/198; 422/200; 422/201; 422/202; 422/205

(58) Field of Classification Search ......... 423/539; 422/129, 198, 200, 201, 202, 205
See application file for complete search history.

(56) References Cited

U.S. PATENT DOCUMENTS

| | | | |
|---|---|---|---|
| 4,633,083 A | 12/1986 | Knorr et al. | |
| 5,275,632 A * | 1/1994 | Corrigan | ............ 48/94 |
| 5,429,809 A * | 7/1995 | Stahl et al. | .......... 422/202 |
| 5,639,431 A | 6/1997 | Shirasaki et al. | |
| 5,876,469 A | 3/1999 | Moriya et al. | |
| 6,572,835 B1 * | 6/2003 | MacArthur et al. | ...... 423/532 |

OTHER PUBLICATIONS

Ozturk, Hammache & Bilgen, A New Process for Oxygen Generation Step for the Hydrogen Prducing Sulphur-Iodine Thermochemical Cycle, Trans IChemE, vol. 72, Mar. 1994.
Stone, Moore & Pickard, Materials for Sulphuric Acid Decomposition in the S-I Cycle, Presentation at AIChE 2006 Annual Meeting, Nov. 16, 2006.
Ozturk, Hammache & Bilgen, An Improved Process for H2So4 Decomposition Step of the Sulfur-Iodine Cycle, vol. 36, No. 1, pp. 11-21, 1995.
Saint-Gobain, Hexology Silicon Carbine Chemical Process Heat Exchanger Tubing, Oct. 10, 2007.
Luu 7 Grant, Thermal and Fluid Design of a Ceramic Bayonet Tube Heat Exchanger for High-Temperature Waste Heat Recovery, http://adsabs.harvard,edu/abs/198SSTIN...8616535L, Aug. 16, 2007.
Project Staff, High-Pressure Catalytic Metal Reactor in a Simulated Solar Central Receiver, GA-A18285 UC-62a, Feb. 1986.

* cited by examiner

*Primary Examiner*—Timothy C Vanoy
(74) *Attorney, Agent, or Firm*—Robert D. Watson

(57) ABSTRACT

A method and apparatus, constructed of ceramics and other corrosion resistant materials, for decomposing sulfuric acid into sulfur dioxide, oxygen and water using an integrated boiler, superheater, and decomposer unit comprising a bayonet-type, dual-tube, counter-flow heat exchanger with a catalytic insert and a central baffle to increase recuperation efficiency.

25 Claims, 9 Drawing Sheets

INTEGRATED BOILER, SUPERHEATER, AND DECOMPOSER FOR SULFURIC ACID DECOMPOSITION

CROSS-REFERENCE TO RELATED APPLICATIONS

This application claims the benefit of U.S. provisional patent application Ser. No. 60/890,878 filed Feb. 21, 2007, which is incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to a method and apparatus for decomposing sulfuric acid into $SO_2$, $O_2$ and $H_2O$.

The production of hydrogen as an alternative fuel can be accomplished through several means, including high temperature thermochemical cycles. These cycles are essentially a coupled set of chemical reactions that result in the decomposition of water to hydrogen and oxygen at much lower temperature than direct dissociation of water. The current focus of research in this area is on the sulfur cycles, which require the decomposition of sulfuric acid ($H_2SO_4$) to form $SO_2$. Sulfuric acid is regenerated in other parts of the cycle. The $SO_2$ produced from $H_2SO_4$ is used in subsequent chemical or electrochemical steps to produce $H_2$. The conversion of $H_2SO_4$ to $SO_2$ can be accomplished at very high temperature (>1000° C.), or at lower temperatures in the presence of a catalyst (~750-900° C.). The combination of concentrated sulfuric acid and high temperatures results in a highly corrosive environment. At these high temperatures required for the reaction, connections, seals and gaskets for process components are susceptible to leaks and failure. Additionally, for the process to be economical, heat input into the process to boil, superheat, and decompose the acid must be recovered and reused. For use on a large-scale, for example to produce hydrogen as an alternative energy source to fossil fuels, the sulfuric acid decomposer must be scaleable, efficient, reliable, and cost effective.

Against this background, the present invention was developed.

SUMMARY OF THE INVENTION

Sulfur-based thermochemical cycles, including the Sulfur-Iodine cycle and the Hybrid Sulfur cycle, are used to produce hydrogen from water. A chemical process common to these sulfur-based cycles is the degradation of sulfuric acid to produce sulfur dioxide, oxygen and water. The acid is heated to boiling, superheated to the decomposition temperature, >750° C., and decomposed. The combination of high temperatures and sulfuric acid produces a highly corrosive environment and high temperature connections between equipment. A method and apparatus, constructed of ceramics and other corrosion resistant materials, for decomposing sulfuric acid into sulfur dioxide, oxygen and water using an integrated boiler, superheater, and decomposer unit comprising a bayonet-type, dual-tube, counter-flow heat exchanger with a catalytic insert and a central baffle to increase recuperation efficiency is described. By using corrosion resistant components and integrating the three processes into a single operation, problems with corrosion and high-temperature connections of equipment are eliminated.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

In the following detailed description, the words "top" and "bottom", "upwards" and "downwards" are used to simplify description of the various parts of the invention (referring to a vertical orientation of the device), but are not intended to limit the actual orientation of the device with respect to gravity. In other words, the device may be oriented vertically, horizontally, or any other angle in-between. The words "chemical reactor" and "heat exchanger" are used interchangeably herein.

Figure 1:
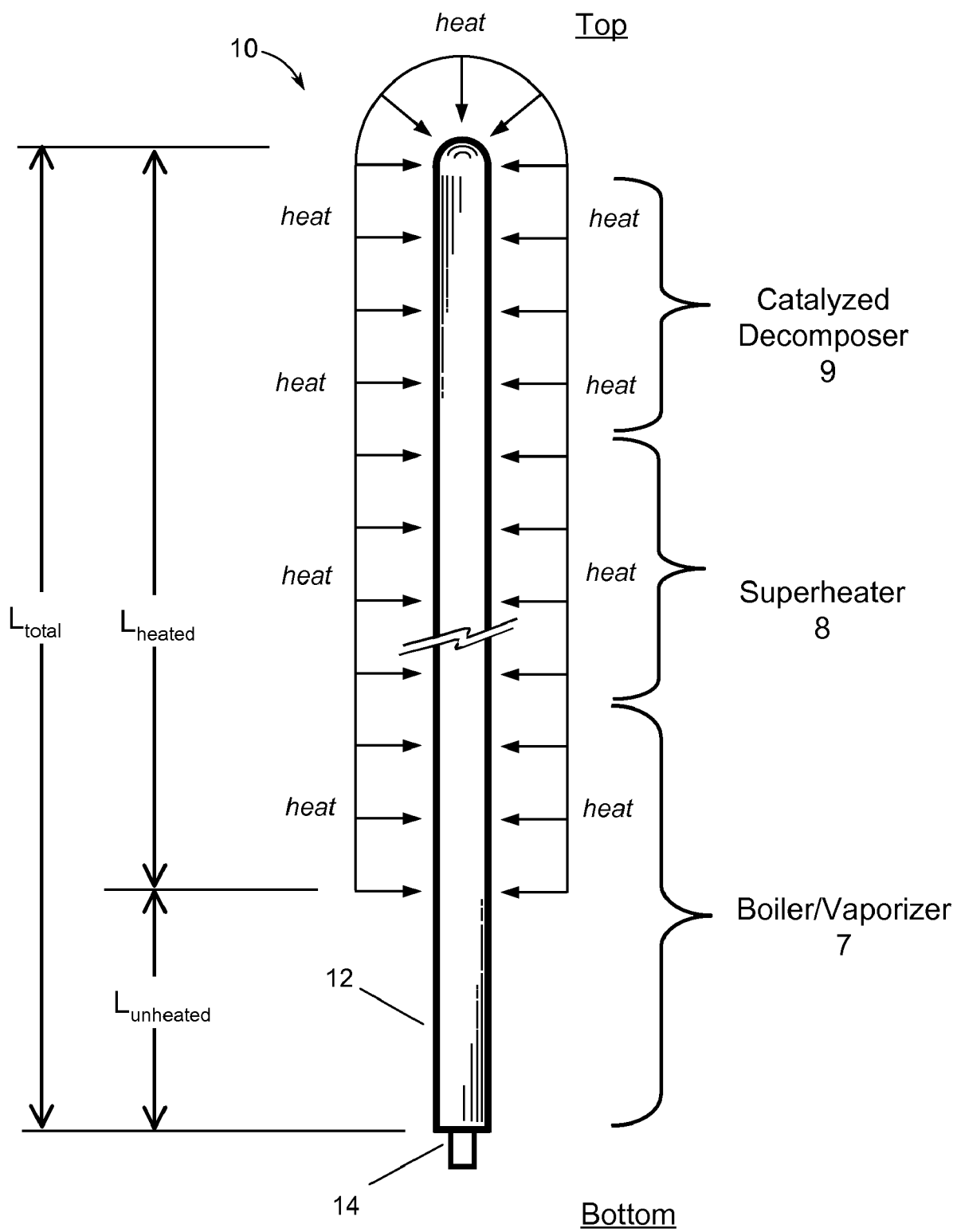
FIG. 1 shows a schematic side view of a first example of an integrated boiler, superheater, and decomposer unit, according to the present invention.

FIG. 1 shows a schematic side view of a first example of an integrated boiler, superheater, and decomposer, according to the present invention. Chemical reactor 10 comprises a bayonet-type, dual-tube, counter-flow heat exchanger with a catalytic insert. Reactor 10 is divided up into three continuously connected regions: a Boiler/Vaporizer region 7, a Superheater region 8, and a Catalyzed Decomposer region 9. The axial length of each region is design-specific. In some embodiments, the axial length of each region is about ⅓ of the total length, $L_{total}$, of reactor 10.

Heat is applied to the outside surface of outer heat exchanger tube 12. The source of heat can be from any source of energy, including nuclear, solar, electrical, and/or chemical combustion; and transported to the surface through any means of energy transport including convection, conduction and/or thermal radiation, through the use of helium, molten salt, or concentrated solar radiation for example. The heated length, $L_{heated}$, can be the same as the total length, $L_{total}$, of the reactor 10. Alternatively, the heated length, $L_{heated}$, can be less than the total length, $L_{total}$. An unheated length, $L_{unheated}$, can be located at the bottom of the outer heat exchanger tube, as shown in FIG. 1. The heat exchanger 10 can be insulated on the outside along any unheated lengths, $L_{unheated}$. Alternatively, the unheated length can be about 40%, or less, of the total length, $L_{total}$.

Outer heat exchanger tube 12 has an outside diameter=$D_{outside}$. In general, the bayonet tubes of reactor 10 are long and slender. In particular, the aspect ratio L/D (i.e., $L_{total}/D_{outside}$) is greater than 10; and can be greater than 30, or greater than 50, or greater than 100, as needed. The outer diameter, $D_{outside}$, of tube 12 can be less than 2 inches, or be in the range of about 1-2 inches, or can be about 1.5 inches. The total length, $L_{total}$, of reactor 10 can be in the range of 2-5 feet, or can be as long as 14 feet; or longer, dependent upon the tube manufacturing capabilities.

Figure 2:
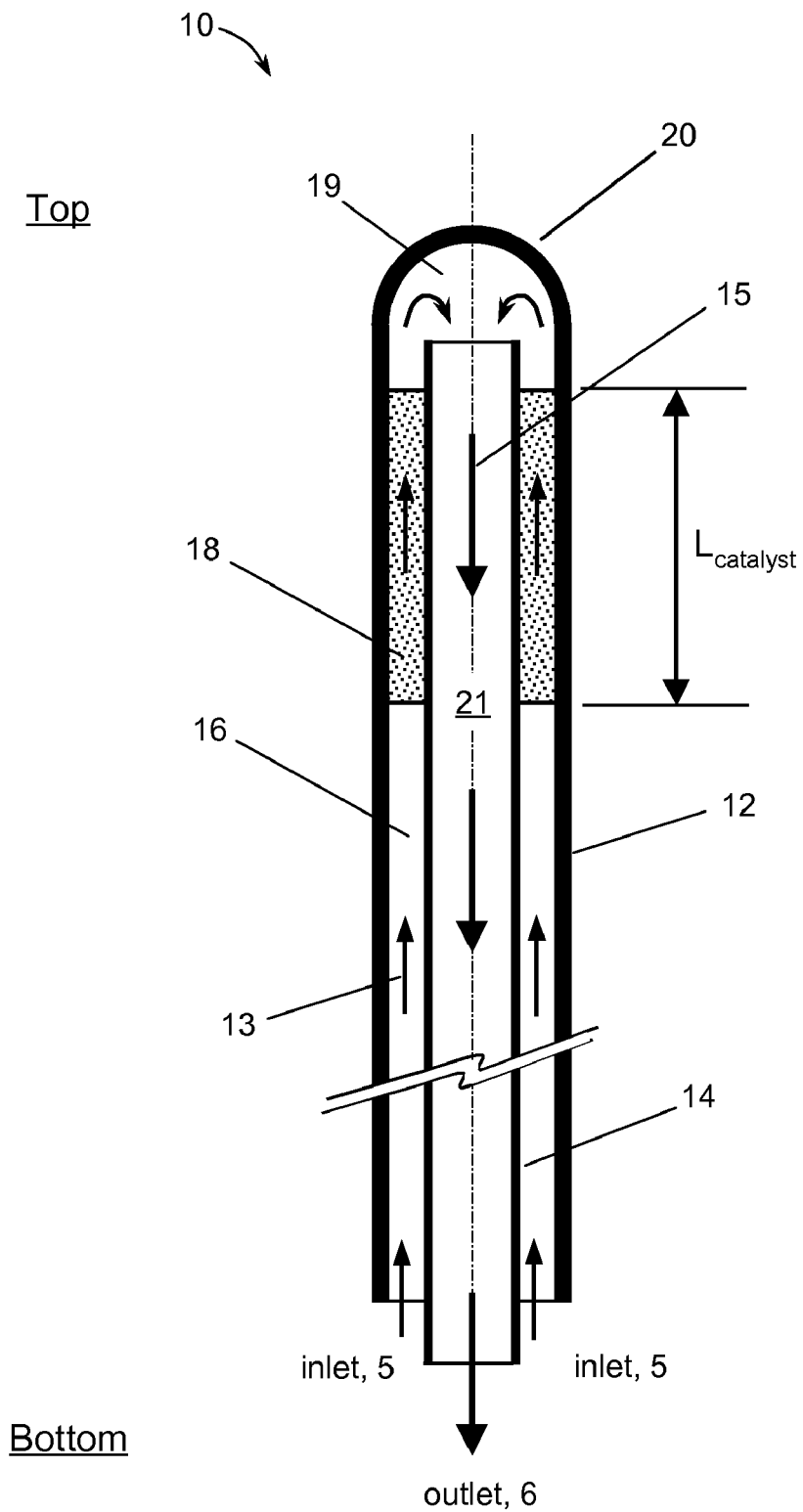
FIG. 2 shows a schematic cross-section side view of a second example of an integrated boiler, superheater, and decomposer unit, according to the present invention.

FIG. 2 shows a schematic cross-section side view of a first example of an integrated boiler, superheater, and decomposer unit, according to the present invention. Chemical reactor 10 comprises a bayonet-type, dual-tube, ceramic, counterflow heat exchanger with a catalytic insert 18. Heat exchanger 10 comprises a ceramic outer tube 12 that is closed at the top and open at the bottom; a ceramic inner tube 14 that is open at both ends and centered inside of outer tube 12; an outer annulus 16 defined by a small gap between the inner and outer tubes; and a catalytic insert 18 disposed in the outer annulus 16. Note: the heating profile applied to the outside surface of outer tube 12 (as shown previously in FIG. 1) is not illustrated in this, and the following figures, for clarity. The fluid to be processed, i.e., process fluid 13, enters the outer annular space 16 at bottom inlet 5; flows upwards along outer annulus 16, then flows through catalyst bed 18; turns around at the top end 20; flows back down through the internal volume 21 of inner tube 14; and finally exits the bottom at outlet 6. Catalytic insert 18 has an axial length=$L_{catalyst}$, which can be equal to about ⅓ of the total length, $L_{total}$. Catalytic bed 18 can be located in the Catalyzed Decomposer region 9 (see FIG. 1), corresponding to the region of highest temperature of the reactor 10. A variety of internal supports or spacers (not shown), can be placed at suitable axial locations to support and center the inner tube 14, such as three-point supports, webs, guides, spiral-wrapped wire spacer, etc.

The closed upper end 20 of tube 12 can have a hemispherical shape, or semispherical shape, or other smooth, generally rounded shape. The radial thickness of the outer annulus 16 (i.e., the radial gap defined as the distance between the inner surface of outer tube 12 and the outer surface of inner tube 14) is generally small; and can be less than 1 mm, or in the range of 0.5 to 1 mm, or about 0.7 mm. Having a small thickness of the outer annulus 16 promotes good transfer of the externally applied heat, as well as the internally recuperated heat, into process fluid 13. In some embodiments, the radial thickness of the outer annulus 16 can be larger in the boiling region (i.e., Boiler/Vaporizer region 7) than in the vapor region (i.e., Superheater region 8). The wall thickness of outer tube 12 can be about 6 mm. The wall thickness of inner tube 14 can be about 2 mm.

The materials of construction of reactor 10 should generally be highly resistant to corrosion by hot sulfuric acid, sulfur trioxide, and sulfur dioxide. Suitable materials for the structural tubing (e.g., outer tube 12 and inner tube 14) include ceramics, silicon carbide, silicon carbide alloys, alumina, quartz, and glass. The active catalyst used in catalytic insert 18 may be chosen from platinum, iron oxide, rhodium, and metal oxides. The active catalyst may be deposited on an inert support material chosen from zirconia, alumina, silicon carbide, oxides, or other ceramic, in the form of balls, pellets, mesh, foam, etc. For example, catalyst media 18 may comprise a packed bed of zirconia balls or pellets coated with platinum, each having a diameter of about 3 mm.

Process fluid 13 flows through reactor 10 in a continuous fashion, and undergoes one or more chemical reactions as the fluid heats up and reacts with the catalyst. Although the reactor 10 can be used with any corrosive process fluid, of particular interest is the decomposition (i.e. conversion) of sulfuric acid into its various components: $SO_3$, $SO_2$, $O_2$ and water. Referring still to FIGS. 1 and 2, concentrated liquid sulfuric acid 13 enters reactor 10 at inlet 5, and flows upwards through outer annulus 16. The inlet temperature is low, typically less than about 100 C. The acid concentration can be from 20 mol % to 100 mol % (i.e. aqueous concentration). As the acid flows upwards in annulus 16, its temperature increases due to the addition of heat from outside of the bayonet as well as heat recuperated from the inner downward fluid flow. In the Boiler/Vaporizer region 7, the acid boils at around 340 C and vaporizes. Then, in the Superheater region 8, the acid vapors are superheated to more than 700 C (e.g., 750-850 C), where the acid vapors decompose into $SO_3$ and $H_2O$. Finally, in the Catalyzed Decomposer region 9, a significant fraction (e.g., more than 25%) of the superheated $SO_3$ vapors are catalytically decomposed into $SO_2$ and $O_2$. Peak temperatures of the heat exchanger 10 are typically less than about 1000 C. The optimal temperature range of the catalytic insert 18 is 700 C to 900 C.

After passing through the catalyst bed 18, the superheated decomposition products 15 (comprising $SO_3$, $SO_2$, $O_2$ and $H_2O$) turns around in the upper plenum space 19, and travels back down through the inside 21 of inner tube 14, ultimately exiting from outlet 6 at the bottom of the heat exchanger. As the decomposition gasses flow downwards through inner tube 14, their sensible heat is exchanged radially outwards through the wall of tube 14 with the incoming acid and vapors traveling the opposite direction (i.e., upwards) in the outer annular space 16, resulting in highly effective recuperation of heat throughout the apparatus. By the time the decomposition products 15 exit the reactor 10 at outlet 6, the outlet fluid temperature is low, typically less than the condensation temperature of sulfuric acid (e.g., 250 C at 3 atm), but usually greater than the condensation temperature of water (e.g., 135 C at 3 atm). Alternatively, the difference between the inlet and outlet fluid temperatures can be less than 100 C, e.g., about 60 C.

This design (i.e., the counter-flow, dual-tube bayonet heat exchanger design of reactor 10) also eliminates any high temperature (i.e., temperatures greater than 250 C) connections of sulfuric acid handling equipment. Depending on the specific design and flow conditions, the fluid exiting from outlet 6 may contain some unconverted (i.e., undecomposed, unreacted) liquid sulfuric acid 13 mixed in with the decomposition gasses 15. This small amount of unreacted sulfuric acid can be recycled back into the inlet stream 13 prior to entering inlet 5.

Because of the counter-flow design of reactor 10, sensible heat contained in the decomposition gasses 15 flowing down through the inner tube 14 can be efficiently transferred radially outwards into the incoming fluid flowing upwards in outer annulus 16. For this reason, the entire axial length of the Boiler/Vaporizer region 7 does not need to be heated from the outside of outer tube 12. For example, in some embodiments, the lower ½ of the Boiler/Vaporizer region 7 is not heated from the outside (as shown in FIG. 1).

Figure 3A:
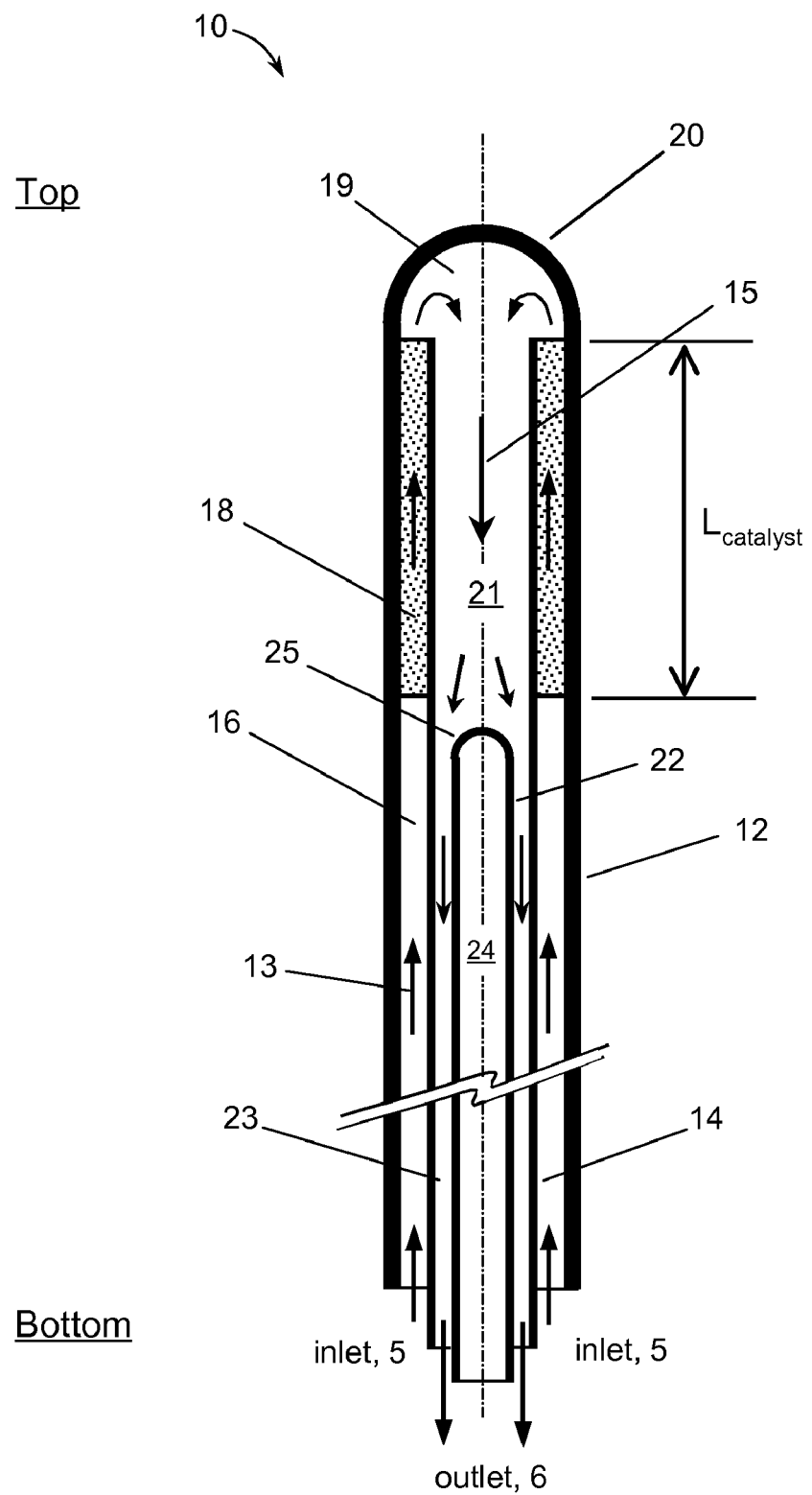
FIGS. 3A and 3B show schematic cross-section side views of a third example of an integrated boiler, superheater, and decomposer unit, according to the present invention.

FIG. 3A shows a schematic cross-section side view of a third example of an integrated boiler, superheater, and decomposer unit, according to the present invention. The same features from FIGS. 1 and 2 apply here, except for an added element comprising a central baffle 22 centered inside of inner tube 14. In this embodiment, central baffle 22 is a hollow tube with a closed upper end 25, an open lower end, and a hollow interior space 24. An inner annular space 23 now exists, located in-between the inner surface of inner tube 14 and the outer surface of central baffle 22. The closed upper end 25 of central baffle 22 forces the down-flowing decomposition gases 15 to be diverted and flow through the inner annular space 23 at a higher velocity. The smaller hydraulic diameter of the inner annular space 23 (as compared to the larger diameter inner space 21 of inner tube 14 shown in FIG. 2) enhances the convective heat transfer coefficient in laminar flow; while the smaller hydraulic diameter and the higher velocity of the inner annular space 23 increases the convective heat transfer coefficient in turbulent flow, of heat transfer from the superheated decomposition gases 15 radially outwards into the outer annulus 16, thereby increasing the overall efficiency of heat recovery in the reactor.

Referring still to FIG. 3A, the closed upper end 25 of central baffle 22 can have a hemispherical shape, or semi-spherical shape, or other smooth, generally rounded shape. The radial thickness of the inner annulus 23 (i.e., the radial gap defined as the distance between the inner surface of inner tube 14 and the outer surface of central baffle 22) is generally small; and can be less than 1 mm, or in the range of 0.5 to 1 mm, or be about 0.5 mm. The smaller the gap, the higher the velocity of decomposition gases 15 flowing in the inner annulus 23, however, with an associated increase in the pressure drop. The central baffle 22, in other embodiments, can have a non-uniform diameter along its length. This allows the radial gap of the inner annular space 23 to be variable along the length of the heat exchanger 10, depending on the need to have higher or lower gas velocity in the inner annulus 23.

Figure 3B:
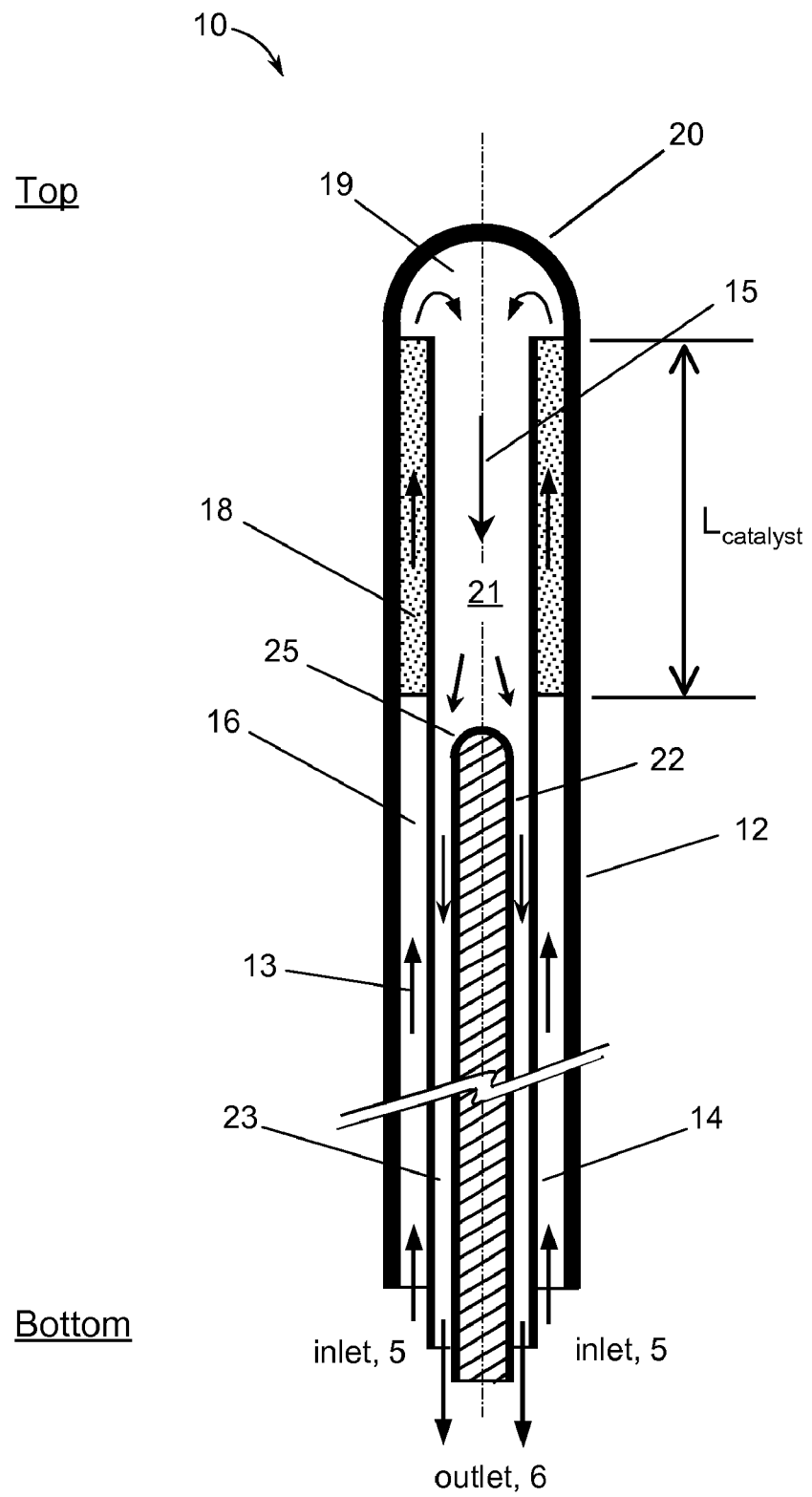

FIG. 3B is the same as FIG. 3A, except that the central baffle 22 has a solid cross-section (i.e., central baffle 22 is a solid rod).

In all embodiments, the diameter of the inner tube 14 can be varied along its length. This allows the radial thickness of the outer annular space 16 to be varied along the length of the heat exchanger 10, depending on the need to have higher or lower flow velocity in the outer annulus 16.

Heat transfer and heat recuperation in the reactor 10 can be enhanced by several means including increasing the surface area of the tubes for higher heat transfer and operating under conditions that result in turbulent flow of the liquid and/or gasses in the apparatus. For example, internal or external fins, grooves, extended surfaces, surface roughness, or other surface modifications or finishes can be used to increase the surface area(s) of the outer and/or inner surface(s) of either the outer or inner tube(s) for the purpose of increasing the area for heat transfer and/or to force turbulent flow.

Figure 4:
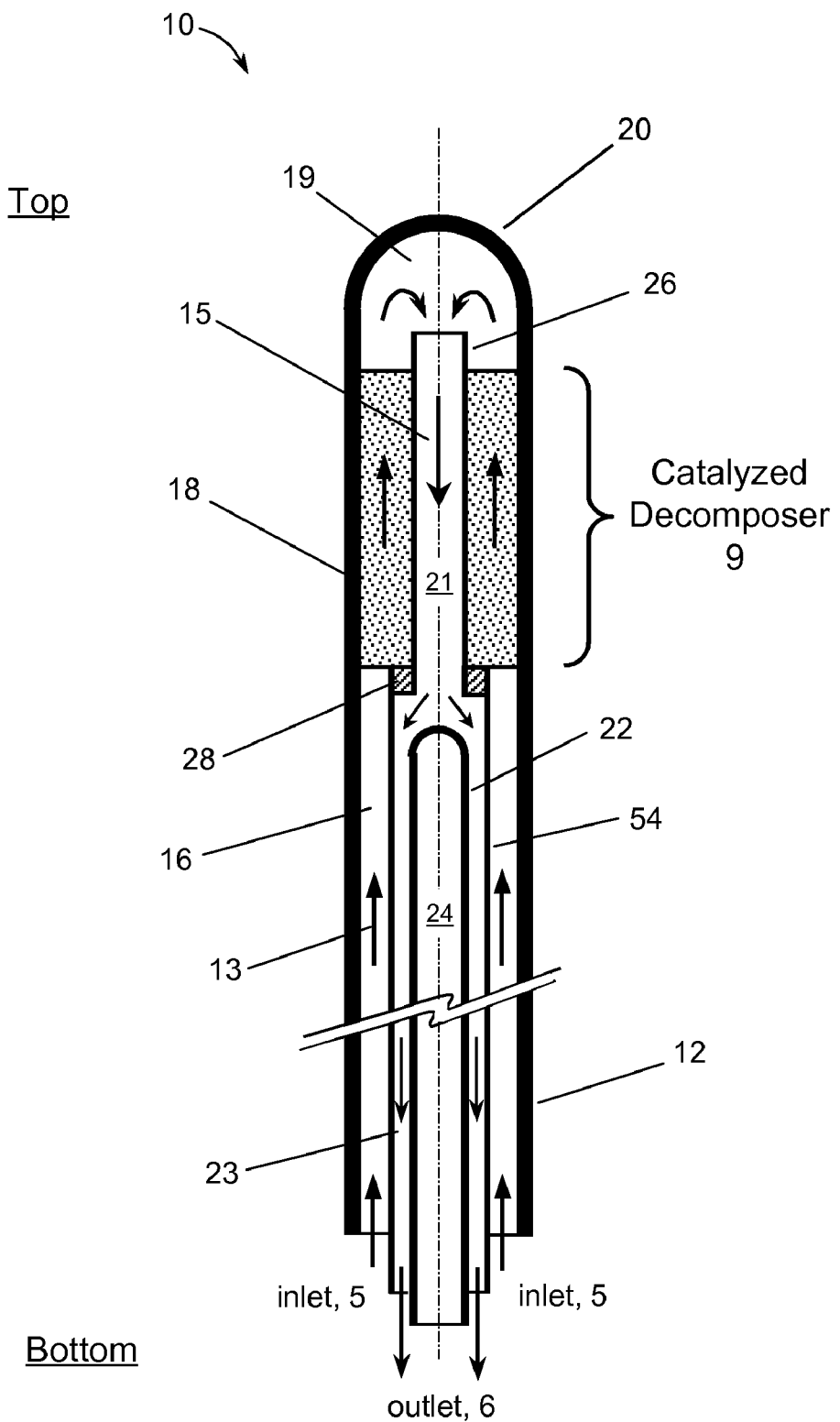
FIG. 4 shows a schematic cross-section side view of a fourth example of an integrated boiler, superheater, and decomposer unit, according to the present invention.

FIG. 4 shows a schematic cross-section side view of a fourth example of an integrated boiler, superheater, and decomposer unit, according to the present invention. FIG. 4 incorporates the general features of FIGS. 1, 2 and 3. However, the inner tube comprises two connected segments: an upper segment 26, and a lower segment 54. The upper segment 26 has a smaller diameter than the diameter of the lower segment 54. The upper segment 26 can be joined to the lower segment 54, for example, by a transition ring element 28. The smaller diameter of the upper segment 26 allows for the catalyst bed 18 to have a greater radial thickness in the Catalyzed Decomposer region 9 than previously shown in FIGS. 1-3. This provides for a greater annular volume to hold more catalyst media. This embodiment allows the diameters of the upper segment 26 and lower segment 54 to be varied independently of each other, thereby allowing the effectiveness and performance of the Catalyzed Decomposer region 9 to be optimized separately from the efficiency of the other two regions (Boiler/Vaporizer region 6 and Superheater region 7). Alternatively, the upper and lower inner tube segments 26 and 54 can be fabricated from a single piece of quartz, instead of using a joining ring element 28.

Figure 5:
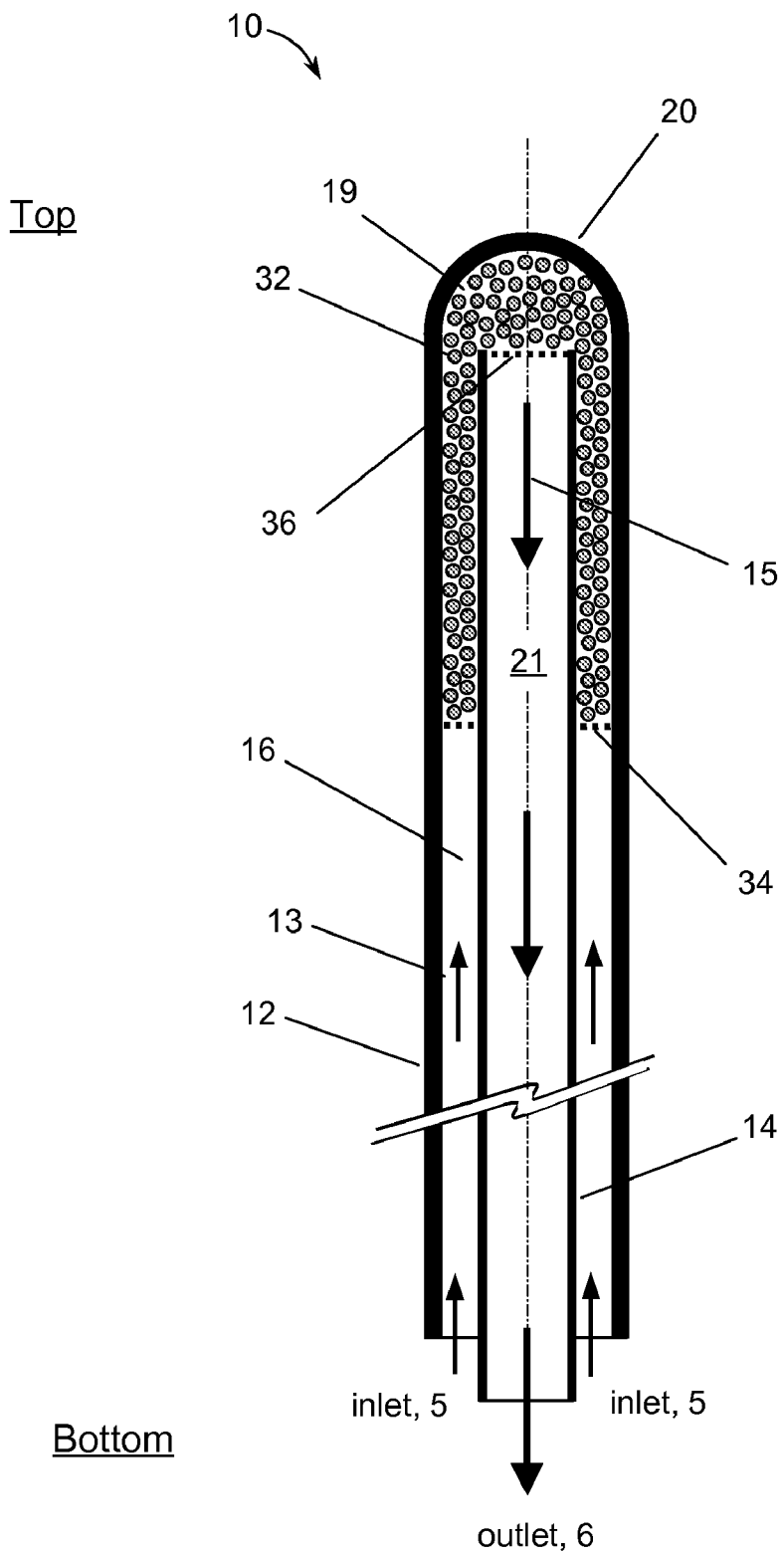
FIG. 5 shows a schematic cross-section side view of a fifth example of an integrated boiler, superheater, and decomposer unit, according to the present invention.

FIG. 5 shows a schematic cross-section side view of a fifth example of an integrated boiler, superheater, and decomposer unit, according to the present invention. In this embodiment, the catalyst media 32 (illustrated as small balls of platinum coated on zirconia substrate) extends into the upper plenum space 19 above the upper end of the inner tube 14. A porous plate or screen 36 covers the upper end of inner tube 14 to keep the catalyst from falling into tube 14. A similar porous plate or screen 34 confines the catalyst media in the lower part of the outer annulus 16.

Figure 6A:
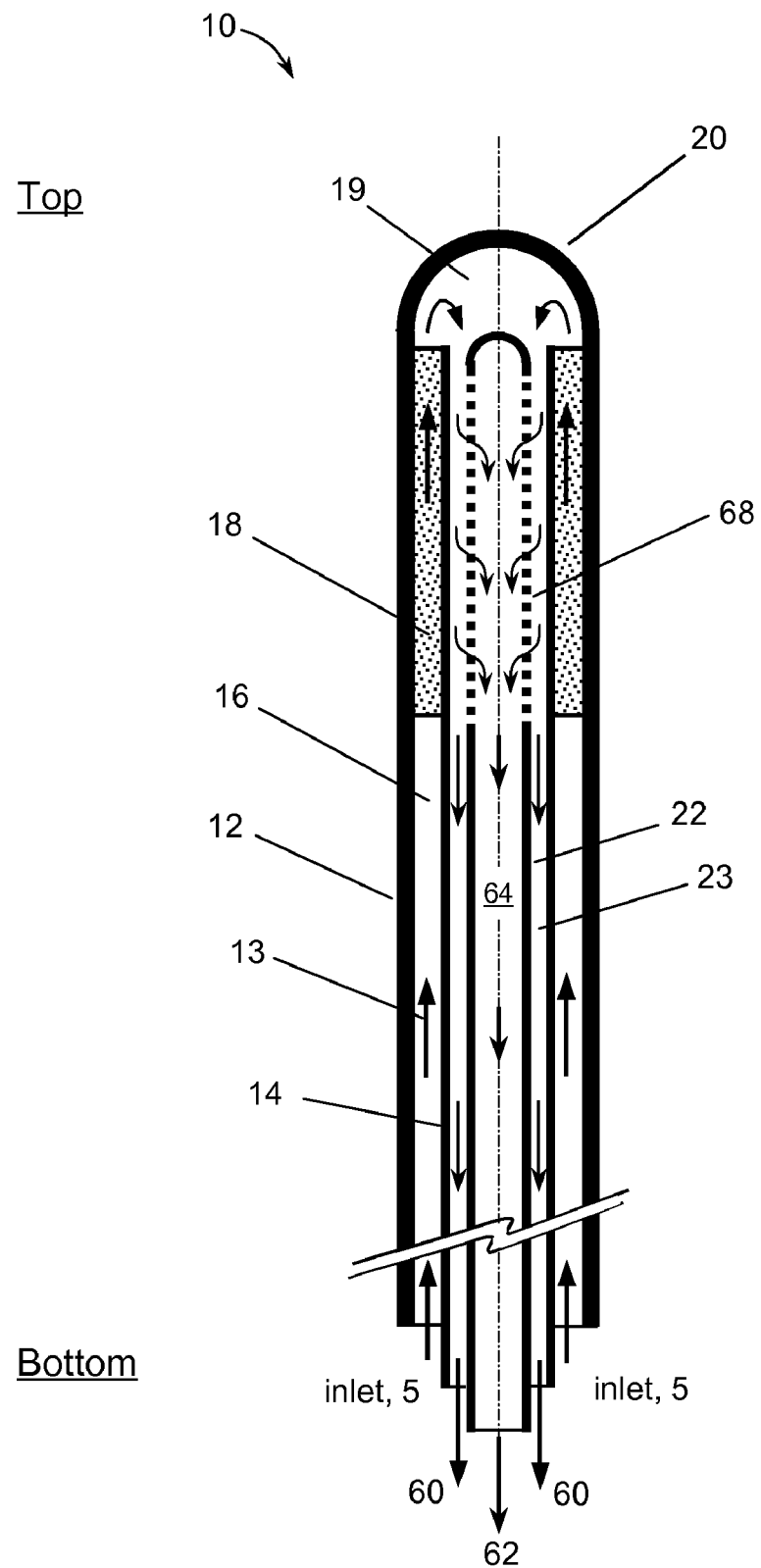
FIGS. 6-A and 6-B show schematic cross-section side views of a sixth example of an integrated boiler, superheater, and decomposer unit, according to the present invention.

FIG. 6A shows a schematic cross-section side view of a sixth example of an integrated boiler, superheater, and decomposer unit, according to the present invention. Central baffle 22 is a hollow tube with a closed top, and open end, and with the upper portion of the tube 22 comprising gas-selective permeable means 68 for selectively passing one or more of the decomposition gases, but not the other(s) from the inner annulus 23 into the inside volume 64 of central tube 22. This can be used in the catalytic decomposer region 9 of the bayonet reactor 10 to increase the amount of acid converted to gaseous products. As an example, gas-selective permeable means 68 can be chosen to allow $SO_2$ gas to pass through it, but not $O_2$ or water. In this case, the $SO_2$ gas diffuses into the inner volume 64 of central baffle 22, wherein it is removed at the bottom through exit 62. The other gases, $O_2$ and water vapor, continue flowing through the inner annulus 23 and leave the reactor at exit 60. By removing the $SO_2$ in the product gases, the equation for equilibrium, given by eq. 1, that governs the total amount of $SO_2$ that can be formed by the decomposition of acid, shifts and more $SO_2$ is formed. In FIG. 6A, the gas-selective permeable means 68 is confined axially to the Catalytic Decomposer region 9.

$$H_2SO_4 \rightarrow SO_2 + \tfrac{1}{2}O_2 + H_2O \tag{1}$$

Figure 6B:
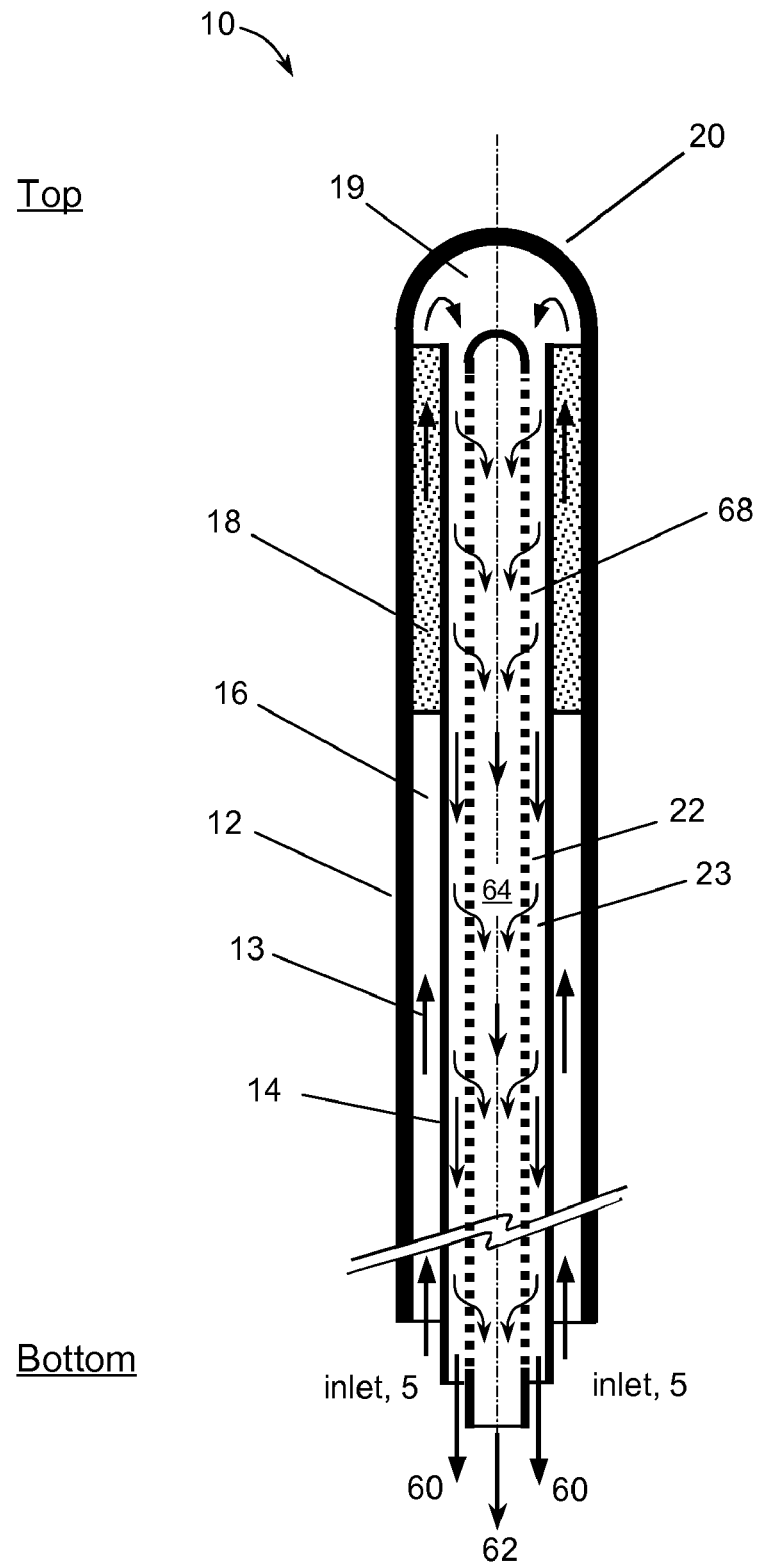

FIG. 6B shows the same design as shown in FIG. 6A, except that the gas-selective permeable means 68 extends along substantially the entire length of central tube 22.

In both FIGS. 6A and 6B, the gas-selective permeable means 68 can comprise, for example, a gas-selective membrane material attached to the outside of the tube 22, where the tube 22 has perforations in the tube's wall located underneath the membrane. Examples of suitable gas-selective membrane materials include Perovskites. Alternatively, instead of a separately attached permeable membrane material, the entire wall-thickness of the tube 22 in the gas-selective permeable means 68 can be made of a porous material (e.g., a porous zeolite) that selectively passes one gas but not others.

The operating pressure of the reactor 10 can range from ambient to 100 bar with a preferred pressure range of 1 to 10 bar.

For decomposition of sulfuric acid, complete or near complete conversion of all acid vapors to $SO_2$, $O_2$ and water is not possible except at exceedingly high temperatures. Therefore, some acid will remain un-decomposed and travel down the inner heat exchanger tube 14 along with the product gasses. The acid can be collected at the exit of the reactor and recycled back into the unit. The amount and composition of the exiting gasses and liquids is not only a function of acid decomposition efficiency, but also the temperature and pressure of the exit stream. As a mixture of undecomposed acid vapor, water vapor, and gasses travel down the inner tube an acid/water composition when the partial pressure of the acid/ water exceeds the equilibrium partial pressure (250 C at 3 atm). At lower temperatures water will condense resulting in a lower acid concentration.

The various embodiments of the present invention, a ceramic double-tube bayonet heat exchanger with catalytic insert, do not require the use of high-temperature connections. This is because both the inlet and outlet fluid connections are made at the bottom end of the reactor where the temperatures are inherently low (less than about 250 C). This allows the use of low-temperature materials, such as rubber o-rings, Teflon, or other plastic materials for seals and gaskets, etc.

Sulfuric Acid Decomposition Testing

A prototype 27" bayonet design sulfuric acid decomposer was tested with a 40 mole % sulfuric acid feed to produce sulfur dioxide, oxygen and water. The catalyst used was platinum coated onto 3 mm diameter by 3 mm height zirconia cylinders. The outer tube (1.5" OD×1.0" ID) was constructed of Hexyloy™ (a silicon carbide alloy, Saint-Gobain Co.) and the inner tube (0.79" OD×0.74" ID) was constructed of quartz. A 0.625" diameter silicon carbide tube closed at one end was placed in the inner tube to enhance heat recuperation. Acid at a flow rate of 13.4 ml/min. entered the apparatus at approximately 30° C. and was heated to approximately 850° C. in the catalytic section. The apparatus was run for several hours. Product gases exiting the apparatus reached a steady state with flow rates of approximately 2.5 L $O_2$/min and 5.0 L $SO_2$/min. Conversion of acid to $SO_2$, $O_2$ and water near the end of the test reached 36%, which is close to the theoretical limit imposed by reaction thermodynamics.

Figure 7:
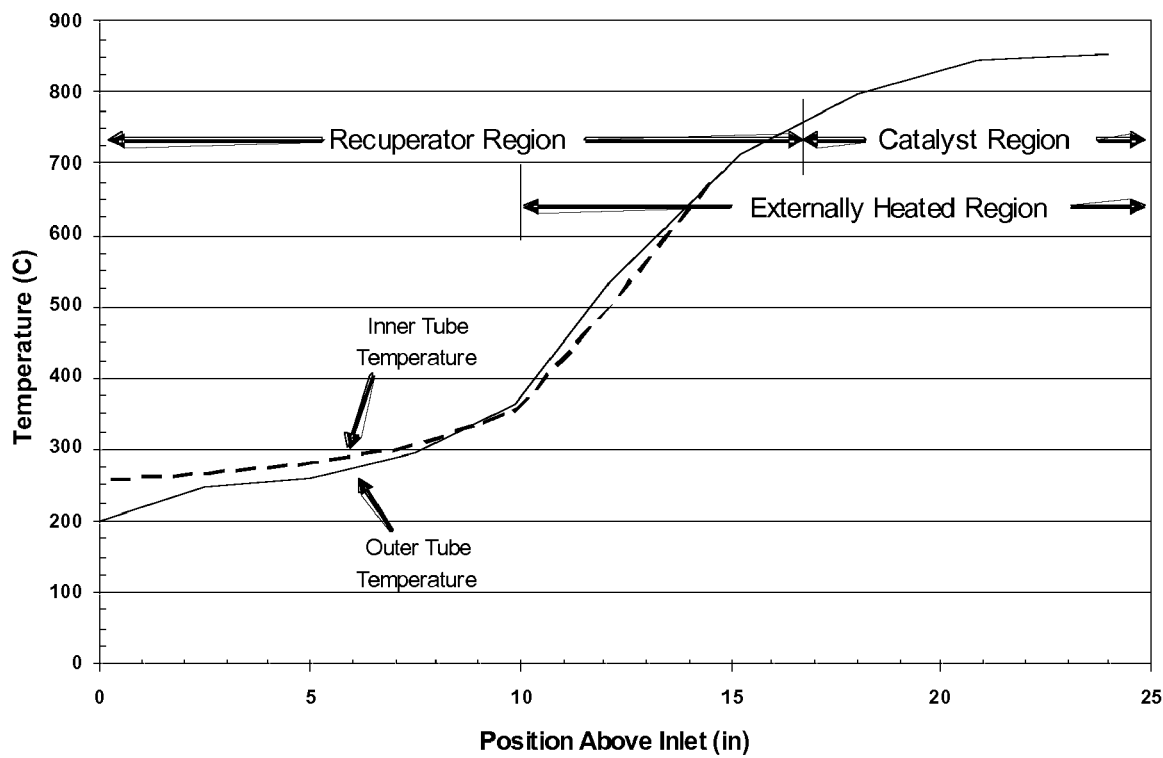
FIG. 7 is a plot of temperature of the outer tube and inner tube as a function of axial position.

In the test, thermocouples were used to measure temperature at different position on the outer and inner silicon carbide tubes. FIG. 7 is a plot of temperature of the outer tube and inner tube as a function of axial position. The data show heat recuperation throughout the superheating and acid boiling sections of the apparatus, with the exit temperature of the product gases being only about 60° C. higher than acid in the annular space at the same axial position in the apparatus.

For scaling-up to produce larger amounts of $SO_2$, for example in a pilot plant or production facility, larger tubes can be used and/or multiple tubes can be used as individual units or connected together. One configuration for utilizing multiple dual tube decomposition units is to connect multiple units together in a conventional tube and shell type configuration. The multiple tubes are connected through a common manifold in a tube and shell type apparatus. Multiple dual-tube bayonet units are connected together and contained inside a common housing or shell. Hot gas, liquid or solid is supplied to the shell side of the apparatus. The hot material enters at one end of the apparatus, releases its heat to the dual tube units and exits at a lower temperature at the opposite end of the shell. Many other configurations to supply energy to individual dual tube units and multiple units connected tighter can be realized. These include, but are not limited to, direct heating of multiple tubes connected together using a direct solar source. Mirrors can be used to collect and direct solar energy directly onto the surface of the dual tube units.

The methods and apparatus of the present invention are not limited to the high-temperature decomposition of sulfuric acid or another chemical(s). It can be used in any process where conditions of extreme temperatures (hot and/or cold or a combination of both), heat recuperation and/or corrosion resistance may be required or encountered. Other applications include the catalytic and/or thermal decomposition or conversion of chemical reagent(s) other than sulfuric acid. The apparatus can be used for the decomposition of a single chemical compound or chemical reactions involving multiple components. The apparatus is not limited to high temperature use. The apparatus can be used under ambient or cryogenic conditions. The apparatus is not limited to use at ambient pressures and can be used under vacuum or at elevated pressures.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A chemical reactor for processing a process fluid, comprising a bayonet-type, dual-tube counter-flow heat exchanger, comprising:
    an outer bayonet tube closed at the top and open at the bottom;
    an inner tube open at the top and bottom ends, and centered inside of the outer tube; for providing a return flow path from the closed end of the outer bayonet tube;
    an outer annular flow space formed between the inner surface of the outer bayonet tube and the outer surface of the inner tube;
    catalyst media disposed in the outer annular flow space near the closed end of the outer bayonet tube;
    a central baffle centered inside of the inner tube; and
    an inner annular flow space formed between the inner surface of the inner tube and the outer surface of the central baffle;
    wherein process fluid enters the reactor at the bottom of the outer bayonet tube, flows through the outer annular flow space towards the top of the outer bayonet tube, turns around at the top, returns back through the inner tube, flowing inside of the inner annular flow space, and exits at the bottom of the inner tube.

2. The reactor of claim 1, wherein the outer bayonet tube, inner tube, and central baffle are made of a ceramic material selected from the group consisting of silicon carbide, silicon carbide alloy, glass, quartz, and alumina.

3. The reactor of claim 1, wherein the catalyst media comprises a catalytic material selected from the group consisting of platinum, iron oxide, rhodium, and metal oxides.

4. The reactor of claim 1, wherein the radial thickness of both the outer annular flow space and the inner annular flow space are less than about 1 mm.

5. The reactor of claim 1, wherein the axial length of the catalytic media is less than or equal to ⅓ of the length of the outer bayonet tube.

6. The reactor of claim 1, wherein the inner tube has a variable diameter; and
    wherein the diameter of that portion of the inner tube which contacts the catalyst media is smaller than the diameter of that portion of the inner tube which does not contact the catalyst media.

7. The reactor of claim 1, wherein the reactor does not have any gaskets or seals for making fluidic connections that operate at temperatures greater than 260 C.

8. The reactor of claim 1, wherein the catalytic media extends into the plenum space located above the top of the inner tube; and a screen or porous plate covers the open top end of the inner tube for excluding catalytic media from entering the inside of the inner tube.

9. The reactor of claim 1, wherein the inner tube is transparent.

10. The reactor of claim 1, further comprising means for enhancing convective heat transfer with the process fluid selected from the group consisting of extended surfaces, internal fins, and roughened surfaces.

11. The reactor of claim 1, wherein the radial thickness of the outer annular flow space is variable, and is larger where the process fluid is substantially liquid, and is thinner where the process fluid is substantially gaseous.

12. The reactor of claim 1, wherein the central baffle comprises a solid rod.

13. The reactor of claim 1, wherein the central baffle comprises a hollow central tube with a closed upper end, and an interior volume.

14. The reactor of claim 13, wherein the hollow central baffle tube further comprises gas-selective permeable means for selectively passing one or more gaseous species from the inner annular flow space into the interior volume of the central tube.

15. The reactor of claim 13, wherein the gas-selective permeable means comprises a gas-selective membrane comprising Perovskite.

16. The reactor of claim 13, wherein the gas-selective permeable means comprises making the hollow central baffle tube out of a porous zeolite material.

17. A chemical reactor for processing a process fluid, comprising a bayonet-type, dual-tube counter-flow heat exchanger, comprising:
 an outer bayonet tube closed at the top and open at the bottom;
 an inner tube open at the top and bottom ends, and centered inside of the outer tube; for providing a return flow path from the closed end of the outer bayonet tube;
 an outer annular flow space formed between the inner surface of the outer bayonet tube and the outer surface of the inner tube;
 catalyst media disposed in the outer annular flow space near the closed end of the outer bayonet tube;
 a central baffle centered inside of the inner tube; and
 an inner annular flow space formed between the inner surface of the inner tube and the outer surface of the central baffle;
 wherein process fluid enters the reactor at the bottom of the outer bayonet tube, flows through the outer annular flow space towards the top of the outer bayonet tube, turns around at the top, returns back through the inner tube, flowing inside of the inner annular flow space, and exits at the bottom of the inner tube;
 wherein the outer bayonet tube, inner tube, and central baffle are made of a ceramic material selected from the group consisting of silicon carbide, silicon carbide alloy, glass, quartz, and alumina;
 wherein the catalyst media comprises a catalytic material selected from the group consisting of platinum, iron oxide, rhodium, and metal oxides;
 wherein the radial thickness of both the outer annular flow space and the inner annular flow space are less than about 1 mm;
 wherein the axial length of the catalytic media is less than or equal to ⅓ of the length of the outer bayonet tube;
 wherein the inner tube has a variable diameter; and wherein the diameter of that portion of the inner tube that contacts the catalyst media is smaller than the diameter of that portion of the inner tube which does not contact the catalyst media;
 wherein the reactor does not have any gaskets or seals for making fluidic connections that operate at temperatures greater than 260 C; and
 wherein the central baffle comprises a hollow central baffle tube with a closed upper end, and an interior volume.

18. A process for decomposing sulfuric acid into $SO_2$, $O_2$, and $H_2O$; comprising:
 a) providing a chemical reactor comprising a bayonet-type, dual-tube counter-flow heat exchanger; the heat exchanger comprising:
  an outer bayonet tube closed at the top and open at the bottom;
  an inner tube open at the top and bottom ends, and centered inside of the outer tube; for providing a return flow path from the closed end of the outer bayonet tube;
  an outer annular flow space formed between the inner surface of the outer bayonet tube and the outer surface of the inner tube;
  catalyst media disposed in the outer annular flow space near the closed end of the outer bayonet tube;
  a central baffle centered inside of the inner tube; and
  an inner annular flow space formed between the inner surface of the inner tube and the outer surface of the central baffle;
 b) supplying heat from an outside source to the exterior surface of the outer bayonet tube;
 c) supplying an inlet stream of concentrated liquid sulfuric acid ($H_2SO_4$), to the outer annular flow space at the bottom of the outer bayonet tube;
 d) flowing the sulfuric acid in the outer annular flow space, and heating the acid beyond the boiling point to form vapors of sulfuric acid;
 e) superheating the vapors to at least 700 C, thereby decomposing the acid vapors into $SO_3$ and $H_2O$;
 f) passing the superheated vapors of sulfuric acid through the catalytic media, thereby forming additional decomposition products comprising $SO_2$, $O_2$, and $H_2O$;
 g) flowing the decomposition products, including any unreacted sulfuric acid, back down through the inner tube, through the inner annular flow space, towards the bottom of the heat exchanger;
 h) recuperating sensible heat from the decomposition products by transferring sensible heat from the decomposition products flowing in the inner annular flow space through the inner tube into the acid flowing in the outer annular flow space; and
 i) discharging the decomposition products, and any unreacted sulfuric acid, from the bottom of the heat exchanger.

19. The process of claim 18, wherein the inlet fluid temperature is less than or equal to 100 C; and the exit temperature of the decomposition products is less than or equal to 260 C.

20. The process of claim 18, wherein the temperature of the catalytic media is 700 to 900 C.

21. The process of claim 18, wherein more than 35% of the incoming sulfuric acid is decomposed into $SO_2$, $O_2$, and $H_2O$ decomposition products.

22. The process of claim 18, wherein 40%, or less, of the lower end of the outer bayonet tube is not externally heated.

23. A process for decomposing sulfuric acid into $SO_2$, $O_2$, and $H_2O$; comprising:
 a) providing a chemical reactor comprising a bayonet-type, dual-tube counter-flow heat exchanger; the heat exchanger comprising:

an outer bayonet tube closed at the top and open at the bottom;

an inner tube open at the top and bottom ends, and centered inside of the outer tube; for providing a return flow path from the closed end of the outer bayonet tube;

an outer annular flow space formed between the inner surface of the outer bayonet tube and the outer surface of the inner tube;

catalyst media disposed in the outer annular flow space near the closed end of the outer bayonet tube;

a central baffle centered inside of the inner tube; and an inner annular flow space formed between the inner surface of the inner tube and the outer surface of the central baffle;

b) supplying heat from an outside source to the exterior surface of the outer bayonet tube;

c) supplying an inlet stream of concentrated liquid sulfuric acid ($H_2SO_4$), to the outer annular flow space at the bottom of the outer bayonet tube;

d) flowing the sulfuric acid in the outer annular flow space, and heating the acid beyond the boiling point to form vapors of sulfuric acid;

e) superheating the vapors to at least 700 C, thereby decomposing the acid vapors into $SO_3$ and $H_2O$;

f) passing the superheated vapors of sulfuric acid through the catalytic media, thereby forming additional decomposition products comprising $SO_2$, $O_2$, and $H_2O$;

g) flowing the decomposition products, including any unreacted sulfuric acid, back down through the inner tube, through the inner annular flow space, towards the bottom of the heat exchanger;

h) recuperating sensible heat from the decomposition products by transferring sensible heat from the decomposition products flowing in the inner annular flow space through the inner tube into the acid flowing in the outer annular flow space; and i) discharging the decomposition products, and any unreacted sulfuric acid, from the bottom of the heat exchanger;

wherein the inlet fluid temperature is less than or equal to 100 C; and the exit temperature of the decomposition products is less than or equal to 260 C;

wherein the temperature of the catalytic media is 700 to 900 C;

wherein more than 35% of the incoming sulfuric acid is decomposed into $SO_2$, $O_2$, and $H_2O$ decomposition products; and wherein 40%, or less, of the lower end of the outer bayonet tube is not externally heated.

24. A process for decomposing sulfuric acid into $SO_2$, $O_2$, and $H_2O$; comprising:

a) providing a chemical reactor comprising a bayonet-type, dual-tube counter-flow heat exchanger; the heat exchanger comprising:

an outer bayonet tube closed at the top and open at the bottom;

an inner tube open at the top and bottom ends, and centered inside of the outer tube; for providing a return flow path from the closed end of the outer bayonet tube;

an outer annular flow space formed between the inner surface of the outer bayonet tube and the outer surface of the inner tube;

catalyst media disposed in the outer annular flow space near the closed end of the outer bayonet tube;

a central baffle, centered inside of the inner tube; and an inner annular flow space formed between the inner surface of the inner tube and the outer surface of the central baffle;

wherein the central baffle comprises a hollow central baffle tube with a closed upper end, and an interior volume; and wherein the hollow central baffle tube further comprises gas-selective permeable means for selectively passing one or more gaseous species from the inner annular flow space into the interior volume of the central tube;

b) supplying heat from an outside source to the exterior surface of the outer bayonet tube;

c) supplying an inlet stream of concentrated liquid sulfuric acid ($H_2SO_4$), to the outer annular flow space at the bottom of the outer bayonet tube;

d) flowing the sulfuric acid in the outer annular flow space, and heating the acid beyond the boiling point to form vapors of sulfuric acid;

e) superheating the vapors to at least 700 C, thereby decomposing the acid vapors into $SO_3$ and $H_2O$;

f) passing the superheated vapors of sulfuric acid through the catalytic media, thereby forming additional decomposition products comprising $SO_2$, $O_2$, and $H_2O$;

g) flowing the decomposition products, including any unreacted sulfuric acid, back down through the inner tube, through the inner annular flow space, towards the bottom of the heat exchanger;

h) recuperating sensible heat from the decomposition products by transferring sensible heat from the decomposition products flowing in the inner annular flow space through the inner tube into the acid flowing in the outer annular flow space;

i) selectively separating, using the gas-selective permeable means, at least one gaseous species of decomposition product from the inner annular flow space into the interior volume of the hollow central baffle tube;

j) discharging the separated-out at least one gaseous species of decomposition product from the interior volume of the hollow central baffle tube at the bottom of the heat exchanger; and k) discharging, as a separate stream from the stream in step j), the remaining un-separated decomposition products, plus any unreacted sulfuric acid, from the inner annular flow space, at the bottom of the heat exchanger.

25. The process of claim 23, wherein the gas-selective permeable means selectively passes $SO_2$ gas through it, but not $O_2$ or $H_2O$.

* * * * *